United States Patent
Karuppiah et al.

(10) Patent No.: US 12,228,993 B2
(45) Date of Patent: Feb. 18, 2025

(54) INTELLIGENT POWER SAVING FOR NETWORK DEVICE STATUS INDICATORS

(71) Applicant: Dell Products L.P., Round Rock, TX (US)

(72) Inventors: Kannan Karuppiah, Fremont, CA (US); Senthil Kumar Ganesan, San Ramon, CA (US); Udhaya Chandran Shanmugam, Santa Clara, CA (US)

(73) Assignee: Dell Products, L.P., Round Rock, TX (US)

( * ) Notice: Subject to any disclaimer, the term of this patent is extended or adjusted under 35 U.S.C. 154(b) by 61 days.

(21) Appl. No.: 18/151,755

(22) Filed: Jan. 9, 2023

(65) Prior Publication Data

US 2024/0231463 A1    Jul. 11, 2024

(51) Int. Cl.
  *G06F 1/00*   (2006.01)
  *G06F 1/3231*   (2019.01)
(52) U.S. Cl.
  CPC .................. *G06F 1/3231* (2013.01)
(58) Field of Classification Search
  CPC .... G06F 1/3231; G06F 1/3203; G06F 1/3234; G06F 1/3287
  See application file for complete search history.

(56) References Cited

U.S. PATENT DOCUMENTS

| | | | | |
|---|---|---|---|---|
| 7,411,174 B2 * | 8/2008 | Eash | ....................... | H05B 47/10 250/221 |
| 10,665,082 B1 * | 5/2020 | Hruska | ................ | G08B 21/182 |
| 2010/0123578 A1 * | 5/2010 | Wray | .................... | G06F 1/3265 345/55 |
| 2010/0253531 A1 * | 10/2010 | Qiu | .......................... | G08B 5/36 340/691.3 |
| 2011/0239056 A1 * | 9/2011 | Adams | .................. | G06F 11/328 714/48 |
| 2011/0296162 A1 * | 12/2011 | Pakenham | ............ | G06F 1/3203 315/132 |
| 2012/0068821 A1 * | 3/2012 | Van Oost | ................ | H04L 12/10 340/6.1 |
| 2012/0288139 A1 * | 11/2012 | Singhar | ................. | G06F 1/3231 382/103 |
| 2014/0285116 A1 * | 9/2014 | Ng | .......................... | H05B 47/16 315/320 |

(Continued)

*Primary Examiner* — Xuxing Chen
(74) *Attorney, Agent, or Firm* — Amin, Turocy & Watson, LLP

(57) ABSTRACT

The technology described herein is directed towards intelligently controlling the power consumed by light emitting diodes (LEDs) of network devices, such as present in a datacenter. An internal device agent, application and/or centralized monitoring system can determine when to activate and deactivate LEDs, such as to activate when a group of devices is likely being observed, and deactivate otherwise. Devices can be grouped for collective control, such as a group per rack of network devices with their LEDs activated and deactivated together. Sensors, such as rack cabinet door sensors, motion sensors and so on can be used to detect whether a group of devices is likely being observed; an action such as closing the door or walking away can be sensed to deactivate the LEDs. After LED activation, expiration of a configurable timer can be used to deactivate the LEDs. Significant power savings are thus achievable in various network scenarios.

20 Claims, 15 Drawing Sheets

(56) References Cited

U.S. PATENT DOCUMENTS

| | | | | |
|---|---|---|---|---|
| 2016/0307413 | A1* | 10/2016 | Rafii | G08B 21/18 |
| 2021/0303054 | A1* | 9/2021 | Zhu | G06F 1/329 |
| 2022/0129361 | A1* | 4/2022 | Randall | G06F 11/325 |
| 2022/0147142 | A1* | 5/2022 | Bui | G06F 1/3287 |
| 2023/0003440 | A1* | 1/2023 | Lu | F25D 23/02 |
| 2023/0280368 | A1* | 9/2023 | Ueda | G01P 15/0891 |
| | | | | 73/493 |
| 2023/0328148 | A1* | 10/2023 | Aruga | H04L 67/1396 |
| | | | | 709/217 |
| 2024/0078983 | A1* | 3/2024 | Nicholson | G09G 5/363 |

\* cited by examiner

1000

| Select country: | United States ▼ | |
|---|---|---|
| Typical appliance: | -- select -- ▼ | |
| Power consumption: | 18768 | watts (W) ▼ |
| Hours of use per day: | 24 | h/day |
| Energy consumed per day: | 450.432 | kVh/day |
| 1 kilowatt-hour (kWh) cost: | 12 | cent ▼ |
| | [Calculate] [Reset] | |
| Energy cost per day: | $54.0518 | |
| Energy cost per month: | $1621.56 | |
| Energy cost per year: | $19728.90 | |

FIG. 10

INTELLIGENT POWER SAVING FOR NETWORK DEVICE STATUS INDICATORS

BACKGROUND

Most networking devices as well as other devices in a datacenter have front panel indicators (typically light emitting diodes, or LEDs) which help to indicate various current statuses, e.g., of a port, a system or some other part of the networking device. Status indicated by these indicators typically include information such as functional, some error state, currently transmitting data, not present, and so forth.

Although LEDs provide a useful mechanism to indicate different scenarios to datacenter administrators, who in general are physically present in the datacenter, LEDs are also power consuming. Command line (CLI) options to enable and disable LEDs can be manually performed, but require significant effort (when large numbers of devices are operating), plus often involve more than one person, such as when the person responsible for connecting the cabling and the like does not have administrator configuration rights.

BRIEF DESCRIPTION OF THE DRAWINGS

The technology described herein is illustrated by way of example and not limited in the accompanying figures in which like reference numerals indicate similar elements and in which:

FIG. 10 is an example representation of an interactive interface by which cost savings can be estimated based on controlled LED operation, in accordance with various aspects and implementations of the subject disclosure.

DETAILED DESCRIPTION

Figure 1A:
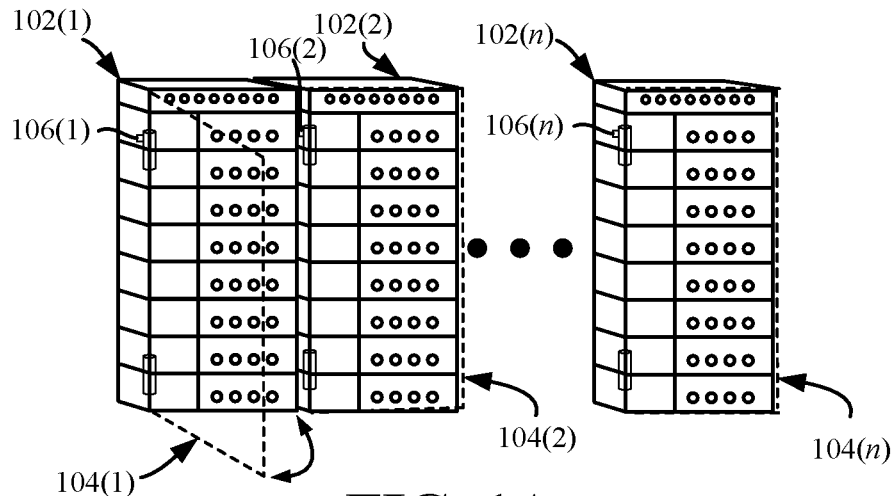
FIG. 1A depicts an example representation of a portion of a data center containing network devices arranged as racks/cabinets with door sensors that are used for intelligent power saving control of device light emitting diodes (LEDs), in accordance with various aspects and implementations of the subject disclosure.

Various aspects of the technology described herein are generally directed towards an intelligent power saving indicator (e.g., LED) solution generally based on whether an observer (e.g., administrator) is likely currently evaluating the indicators of a device or group of devices. In one implementation in which devices (e.g., servers, storage, and other network devices) are arranged in a rack, cabinet or similar configuration behind a door or other enclosure, the technology described herein can be based on a door sensor or the like that detects whether the door in is an open or closed state. In general, an agent, running on a device, issues one or more commands such that relevant indicators are powered up when the door is opened, and enters an energy saving mode of operation (e.g., deactivated fully or to some extent) when the door is closed. A user-configurable timer can be used to deactivate the indicators if, for example, the door is not timely closed. Other sensors including some non-limiting examples described herein can be used instead of, or in addition to, door sensors.

It should be understood that any of the examples herein are non-limiting. As one example, the technology is described in with various types of possible sensors in a rack of devices such as servers, including when implemented in a datacenter, however this is only an example, and technology described herein can be implemented with other types of sensors, and/in similar configurations and environments, including those not yet implemented. For another, some of the examples herein are based on groups of devices such as related by physical arrangements (e.g., in the same rack), however any physical, logical or other groupings of devices can be used to associate sets of devices with one another. Thus, any of the embodiments, aspects, concepts, structures, functionalities or examples described herein are non-limiting, and the technology may be used in various ways that provide benefits and advantages in networking, power saving and computing in general.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

FIG. 1A shows a portion of a datacenter in which network devices are deployed within racks 102(1)-102(n), basically in cabinet-style arrangements. Typically, a rack contains a number of servers, storage devices, and other network devices such as switches or routers. In the example of FIG. 1A, the racks 102(1)-102(n) are each deployed as part of an enclosure with a cabinet door, e.g., the door 104(1) depicted via dashed lines and shown as open, and the doors 104(2)-104(n) depicted (via dashed lines) as closed.

A sensor is installed the detect the state of each cabinet door, and it is coupled to at least one device that hosts an agent (e.g., an application) and/or directly or indirectly coupled to each other device in the rack for which indicator (LED) control is desired. In the example of FIG. 1A, the door sensors 106(1)-106(n) are depicted as attached to door hinges or the like, however it is understood that a door sensor can be configured in many various ways to detect a door's open or closed (or even intermediate) state, e.g., proximate a door latch, electro-magnetically, opto-electronically and so on.

Figure 1B:
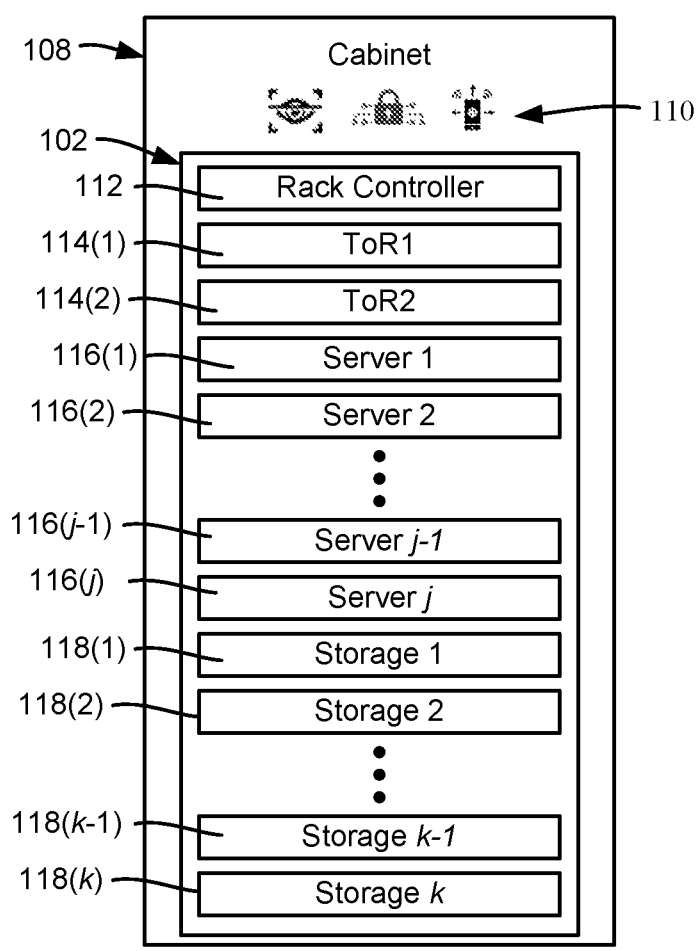
FIG. 1B is an example block diagram representation of devices of a server rack enclosed within a cabinet and coupled to one or more sensors for LED control, in accordance with various aspects and implementations of the subject disclosure.

FIG. 1B shows a rack 102 of networking devices enclosed within a cabinet 108. Three various possible sensors are represented in FIG. 1B by the depicted symbols 110, and can include, but are not limited to, a vision detection (e.g., eye gaze) sensor, a lock/door state sensor, and a motion sensor. As is understood, only sensor one needs to be present in and or otherwise associated with a given group of devices, although more than one sensor may be present in a given implementation. In FIG. 1B the symbols 110 including the "lock" symbol representing the door sensor is shown near the top of the cabinet 108, but as is understood, any suitable type of sensor can be located anywhere appropriate for sensing, such as described with reference to FIG. 1A. One or more of such sensors also can be coupled to LEDs to directly indicate (e.g., temporarily) current sensor state, but a sensor need not output any visible or other indication of its state.

The example rack devices shown in FIG. 1B include, but are not limited to, a rack controller/controller server 112, two ToR (top-of-rack) switches 114(1) and 114(2) (a different number of ToR switches may be present), servers 116(1)-116(j), and storage devices 118(1)-118(k); up to any practical number of devices can be present in a group of associated devices. As is understood, a different rack and/or other device group may include other types of devices in addition to or instead of those shown in FIG. 1B, and/or there may be less devices than those shown in FIG. 1B.

Figure 2:
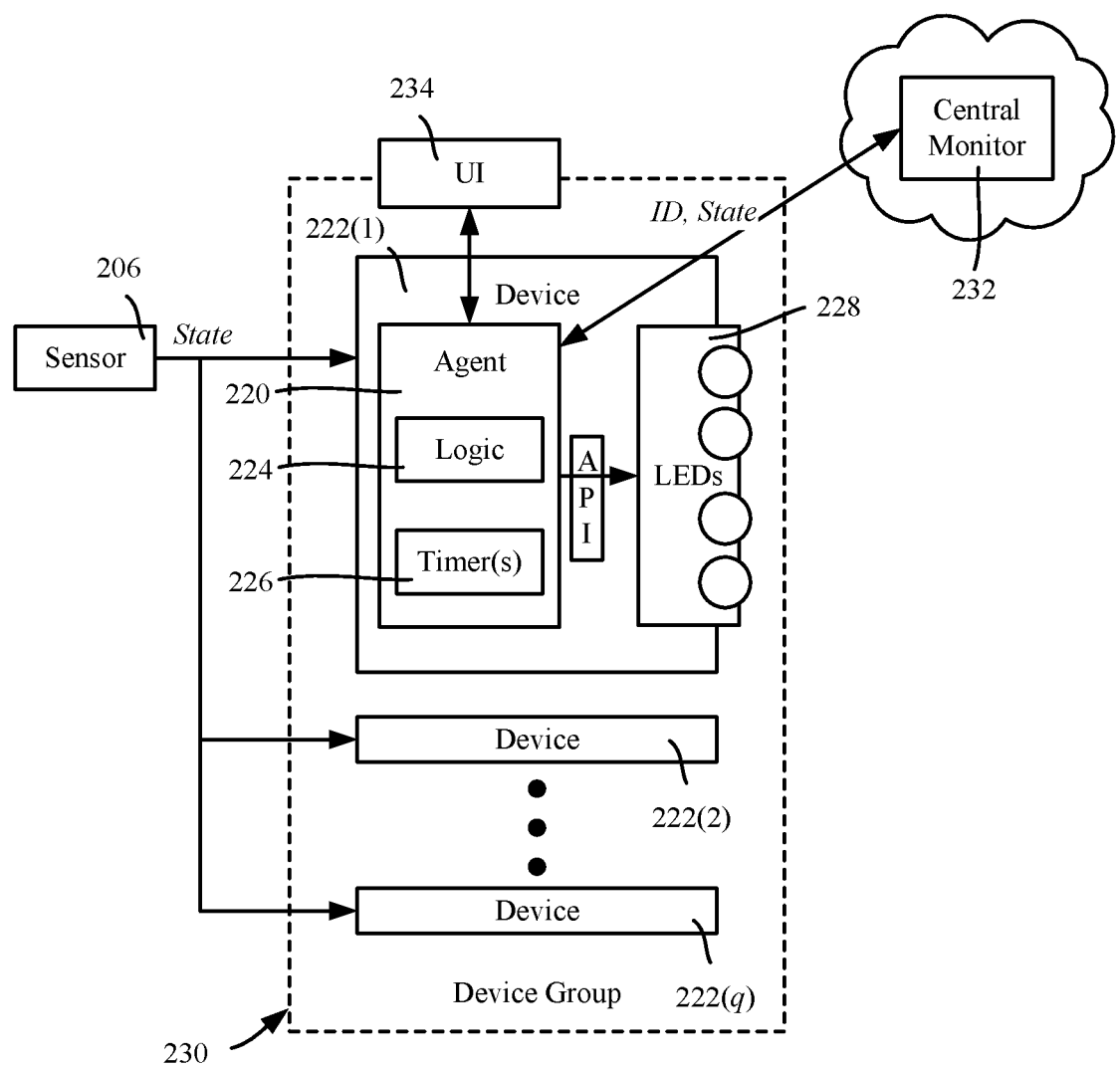
FIG. 2 is a block diagram representation of an example system/architecture for intelligent control of network device LEDs, in accordance with various aspects and implementations of the subject disclosure.

In the door sensor example of FIG. 1A, when the door 104(1) is opened, the sensor (e.g., 106(1)) sends information such as a signal (=1) to an application program or the like. Such an application program is shown in FIG. 2 as an agent 220 incorporated into a device 222(1) and coupled to a sensor 206. Other application programs, scripts and so on are feasible, and need not necessarily be incorporated into one of the network devices. One suitable device for hosting the agent 220 may be the controller device 112 of FIG. 1B, which can communicate with each other device.

In FIG. 2, the agent 220 includes logic 224 (as described herein with reference to FIGS. 6, 8 and 9) and a timer (or timers) 226 that, based on the state information received from the sensor 206, drive the LEDs 228 of the device 222(1). While four round LEDs are depicted in the example of FIG. 2, any practical number, shape and the like may be used as status indicators, as well as alternatives to LEDs, including those not yet developed and/or commercially available.

Note that most contemporary devices each have an API by which an application can interface with that device, and thus in one implementation the application (in this example the agent 220) can use the existing device API to turn on/off (or otherwise control) the LEDs 228. For example, when the door is opened and the sensor 206 sends a signal (e.g., =1), the agent 220 (application) can trigger the LED status "on" message by generating the appropriate command line interface (CLI) command or graphical user interface command for the device, output the command, and similarly send the command to all (or some defined subset) of the devices in the rack. When the door is closed, the door sensor 206 sends the signal (e.g., =0) to an application (the agent), and the application can turn off the LEDs 228. A running timer 226 can also send the signal (e.g., =0) upon timer expiration, for example.

As shown in FIG. 2, the device 222(1) can be part of a device group 230, shown as including devices 222(1)-222(q). In this way, a single sensor such as the sensor 206 can be sensed to control the LEDs of the device group 230 as a whole. Note that a typical device group association may include all the devices in a rack, e.g., as defined by an administrator or designer of a datacenter. However, this is only an example of a group, and many other device groups can be physically and/or logically configured. As an alternative example, different groups can be configured per rack, such as one group comprising the server devices, another group for storage devices and so on. Indeed, if, for example, an administrator wants to view the status indicators of multiple switches among the other various devices, it is feasible to define a "switch group" that can be separately controlled as desired to activate and deactivate its status indicators.

An agent or application program can be per device, or can be a controller (e.g., incorporated into an existing rack controller, or a controller agent operating within another rack device) for a group or subgroup of devices. Further, a central monitor 232 such as Dell EMC® Cloud-IQ (artificial intelligence/machine learning-based technology for system monitoring, and predictive analytics) can obtain messages from the agent 220, and, for example, can send a REST API or the like to control the LEDs for any number of associated/grouped devices.

Note that instead of or in addition to the central monitor 232, a user interface (UI) 234 can be provided to interact with the agent 220. For example, as described herein, the timer/timers 226 can be user configurable, and the user interface 234 can be used by an administrator to set the timeout criteria. Other variables described herein can also be set via the user interface, e.g., a "pause" time described with reference to FIG. 3, a deactivation state other than full "off" (e.g., one or more LEDs of a group mostly off but occasionally blinking at a slow rate so that some indication of power/operating normally is observable, and so on). It is also feasible to have a different timeout time or other alternative LED operation configured, such as when an error status condition is detected versus normal operation; for example, an error can turn an LED on for a relatively long period of time even if no observer is likely present so that an administrator relatively far away can note the situation, possibly even via a camera.

Figure 3:
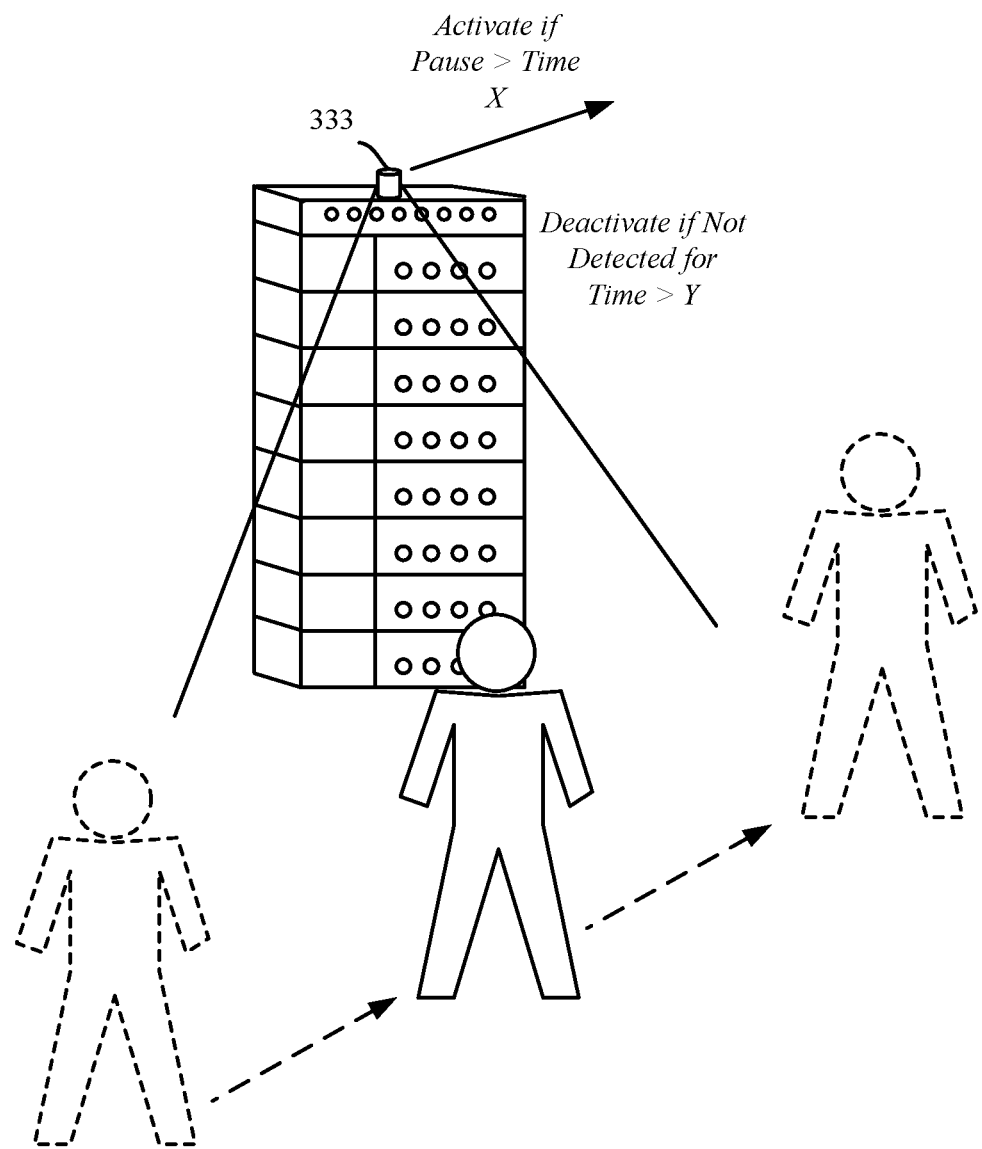
FIG. 3 is an example representation of how a motion sensor can be used to sense an observer with respect to controlling device LED operation, in accordance with various aspects and implementations of the subject disclosure.

Turning to alternative sensors, a rack/cabinet typically has a transparent door. This allows rapid viewing of a group of enclosed devices' status information. Based on the technology described herein, in some scenarios it may be beneficial to control the status indicators' illumination states without having to open each cabinet door. To this end, as shown in FIG. 3, a motion sensor 333 can be arranged to detect whether an observer appears to be interested in viewing the status indicators, of, for example, a rack of devices, as opposed to simply walking past. For example, the motion sensor 333 can be used to start a timer, and if the person's motion halts or stays within a sensing range for some time X, a pause can be detected. This pause can be used as a criterion to determine the likelihood of wanting to observe the status indicators, or whether someone is just passing by. The timer, and if activated the LEDs, can be reset if a pause is not detected within a time Y. The values of X and Y can be user configurable.

Figure 4:
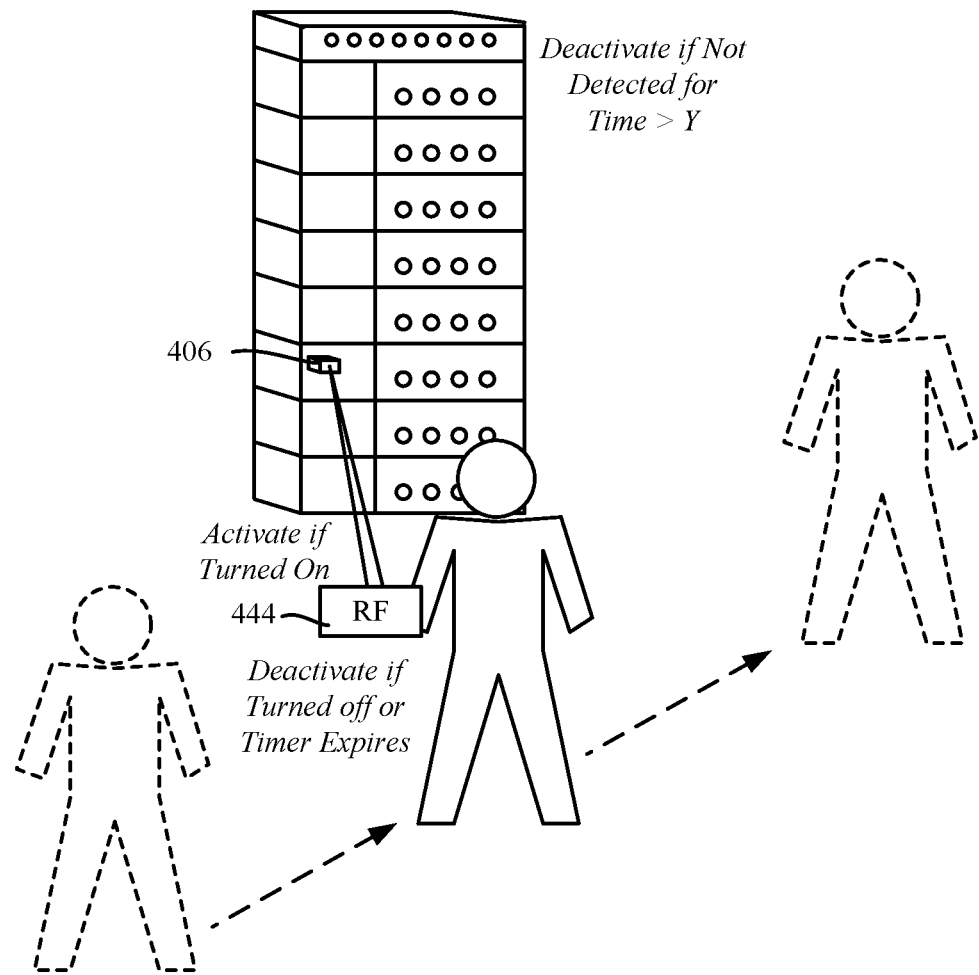
FIG. 4 is an example representation of how a radio frequency device and sensor can be used to sense an observer with respect to controlling device LED operation, in accordance with various aspects and implementations of the subject disclosure.

As another example alternative, consider that as depicted in FIG. 4, the administrator is carrying some radio frequency (RF) output device 444, such as an infrared/RF remote control, radio frequency tag, near field communication device, and so on, of which the sensor 406 is capable of detecting signals therefrom. Via the radio frequency device 444, the administrator can choose to turn the LEDs on or not for any group of devices within a given distance, or via an entered identifier. Other sensors can be used to detect the likelihood of wanting to observe, e.g., voice command detection, gesture detection, eye-gaze tracking and so on, to thereby activate and/or deactivate status indicators.

Figure 5:
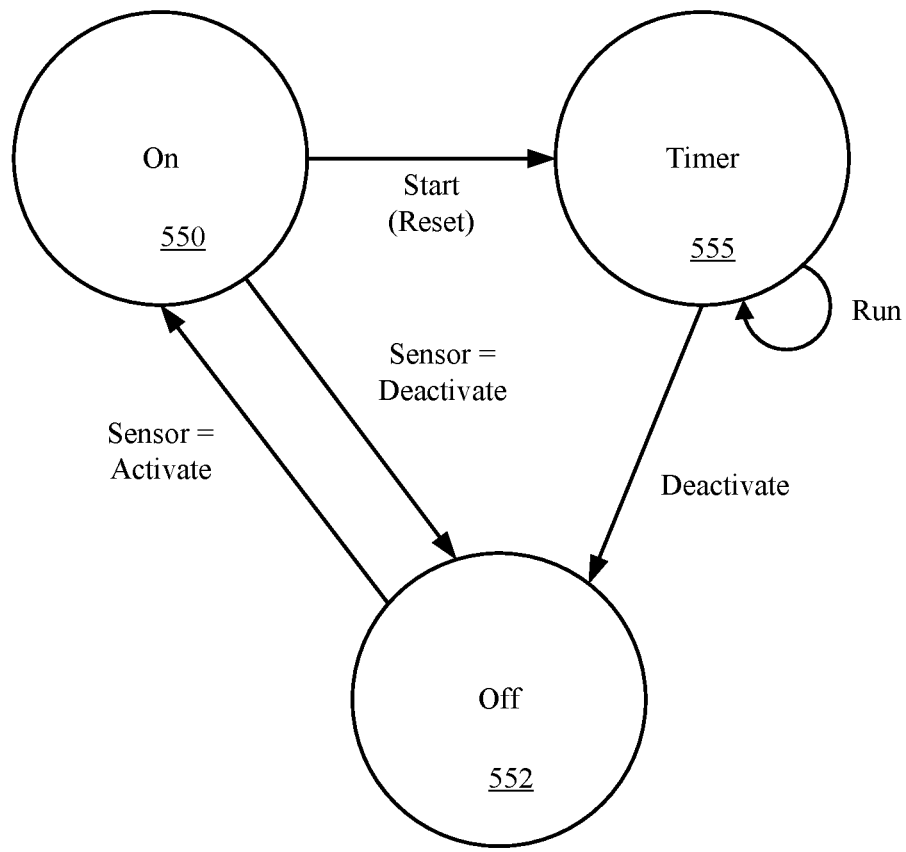
FIG. 5 is an example state diagram representing states and transitions between states with respect to controlled LED operation, in accordance with various aspects and implementations of the subject disclosure.

Regardless of the sensor used and the grouping of devices, various states are transitioned to and from, as generally shown in FIG. 5. An "On" state 550 based on the sensor indicating "activate" can transition to an "Off" state 552 directly via deactivation as described herein, or can start a timer (state 555) for indirect deactivation after the timer 555 runs to expiration.

Figure 6:
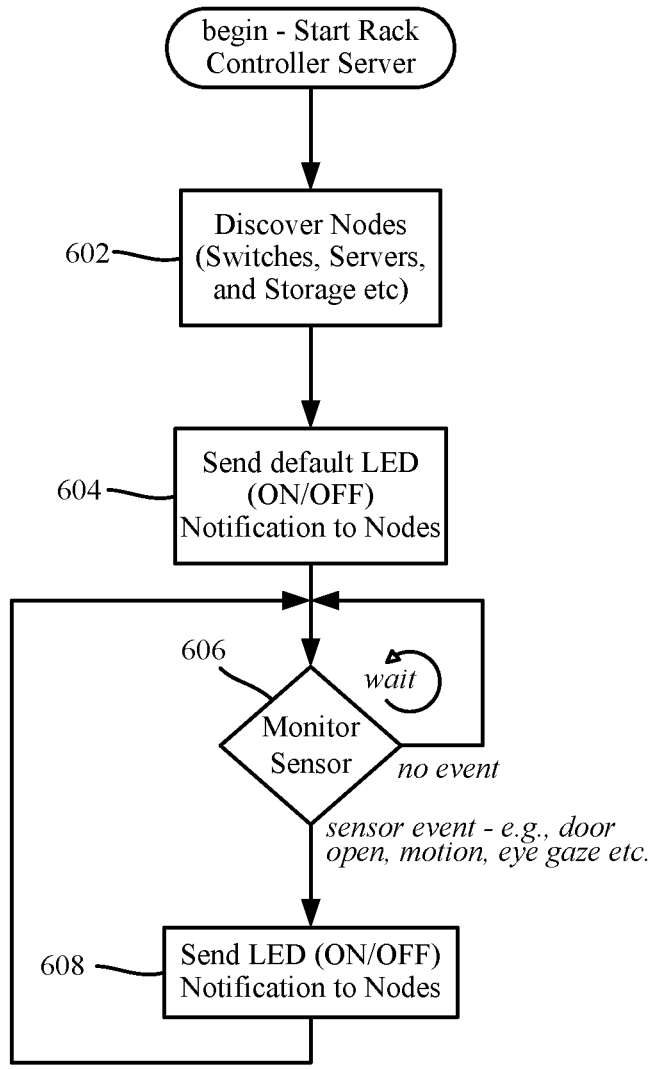
FIG. 6 is a flow diagram showing example operations related to LED control via a rack controller, in accordance with various aspects and implementations of the subject disclosure.

FIG. 6 is a flow diagram showing example operations of a controller, such as the controller server for the devices of a rack. Once started (e.g., powered up, rebooted, or otherwise reset) at operation 602 the controller (via the simple network management protocol (SNMP), link layer discovery protocol (LLDP), and/or ping) discovers the nodes (e.g., switches, servers, storage devices, and the like) that the controller is to control.

At operation 604, the controller sends a default (which can be user configurable) LED notification signal to the discovered nodes, e.g., all or a subset of them, whereby the nodes turn off or on their LEDs as directed. Operation 606 represents monitoring for a change to the sensor state. As can be seen, the controller waits for an event.

When a sensor event is detected and triggers an LED state change, the controller sends via operation 608 the corresponding LED notification signal, in this example ON or OFF to the discovered nodes. Note that what is considered a triggering event may not be a single occurring event such as a door opening or closing, but can, for example, be the result of a "motion paused for a sufficient time" determination, an "eye gaze directed at the rack" determination, a particular voice command or gesture command being detected, and so on. Further, as described herein a sensor event can reset/start a timer, and the timer can trigger the LED state change event.

Figure 7:
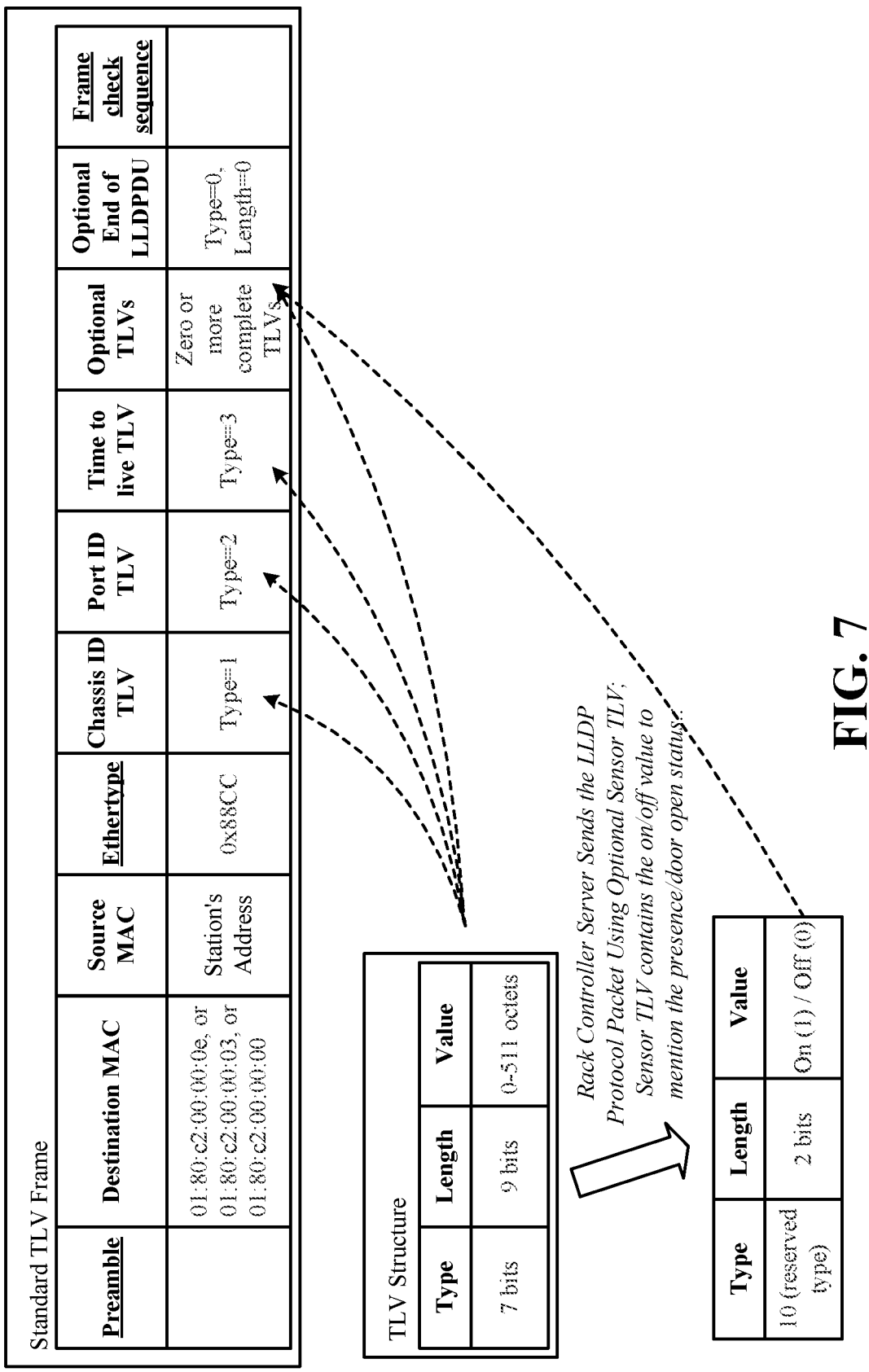
FIG. 7 comprise example data structure representations demonstrating one way in which a controller can control LEDs based on sensor information, in accordance with various aspects and implementations of the subject disclosure

FIG. 7 shows how existing data structures can be used to control the LED state changes via inter-device communications, which in the example of FIG. 7 are based on the link layer discovery protocol (LLDP) data packets associated with an optional "sensor" TLV (type-length-value) containing on or off data. As seen in this example, a standard TLV frame 770 can include TLV structure(s) 772, which in this example includes an optional sensor TLV data structure 774. The sensor TLV 774 contains the On or Off value, although other related data can be sent (e.g., generally Off to reduce power but not fully off, blink, and so on as described herein).

Figure 8:
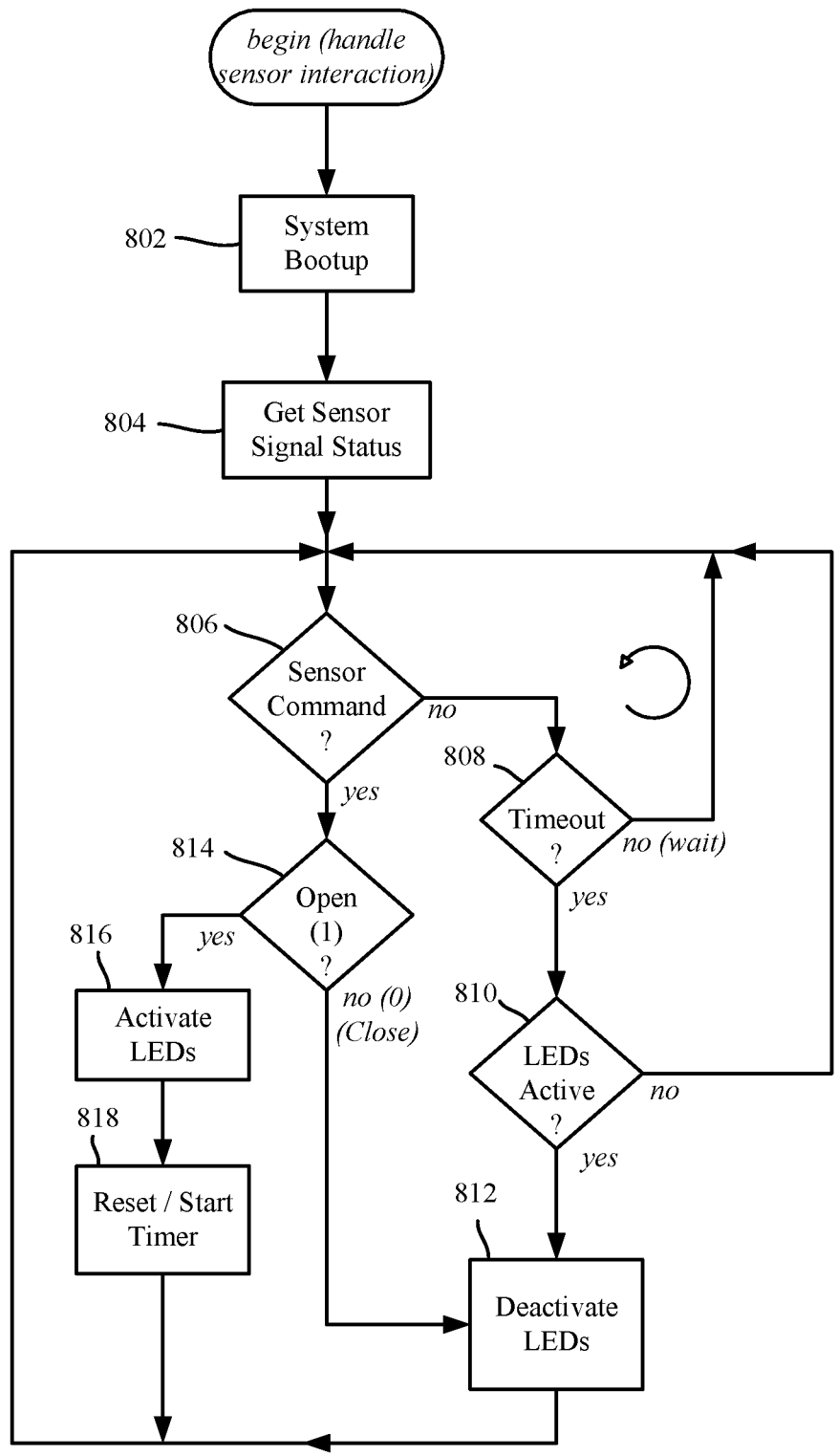
FIG. 8 is a flow diagram showing example operations related to handling sensor information by a controller, device agent or the like, in accordance with various aspects and implementations of the subject disclosure.

FIG. 8 is a flow diagram directed towards various example aspects described herein, such as the logic/functionality of an (LED) agent that runs in each node/device/device grouping (e.g., in a controller for the entire group). Note that FIG. 8 is only one example, and many other variations of operations can accomplish the general concepts described herein.

At operation 802, the system (or some group such as a rack of devices) boots up and begins operation. At operation 804, the agent gets the initial sensor signal status.

Operation 806 represents waiting for a sensor command/information, which, via operations 808 and 810, will eventually time out if no sensor command is received, and deactivate the LEDs via operation 812, if they are active. Note that this allows the LEDs to be in an active state from the moment the last sensor detection message was received to '/' time units (e.g., seconds, minutes or the like), where 'f' can be a default value or value configured by the data center administrator or the like.

When sensor information (a command) is received (or state change detected), operation 806 branches to operation 814 to determine whether the command represents a door open (a 1 signal) or similar trigger activation sensor output (e.g., pause detected (FIG. 2)/RF signal detected (FIG. 3)). If the command is an "open" (1) command, operation 816 activates the LEDs, and operation 818 resets and starts the timeout timer. In this way, the LEDs remain activated for at least the timeout time; an administrator in need of more time can shut and reopen the door, wave arms in front of a motion sensor, cause the RF device to output another signal, and so on. Note that another timer can be in use, e.g., an override mode can keep the LEDs activated for a much longer configurable period of time than without override, such as five minutes without override, or two hours with override left on (should the administrator forget to turn override off).

If instead at operation 814 the command was a "close" (0) command to deactivate, operation 812 is performed to deactivate the LEDs. Note that deactivation can turn the LEDs off, but does not necessarily have to do so, and instead of completely off, can place the LEDs in some energy saving mode of operation, e.g., a dim glow, low-duty cycle, slow blink, color change and/or the like. As can be seen, in the example of FIG. 8 the process loops (although event-driven operations are feasible) such that when activated, LEDs remain on until deactivated by an explicit action (cabinet door is closed) or deactivated by timer expiration.

Figure 9:
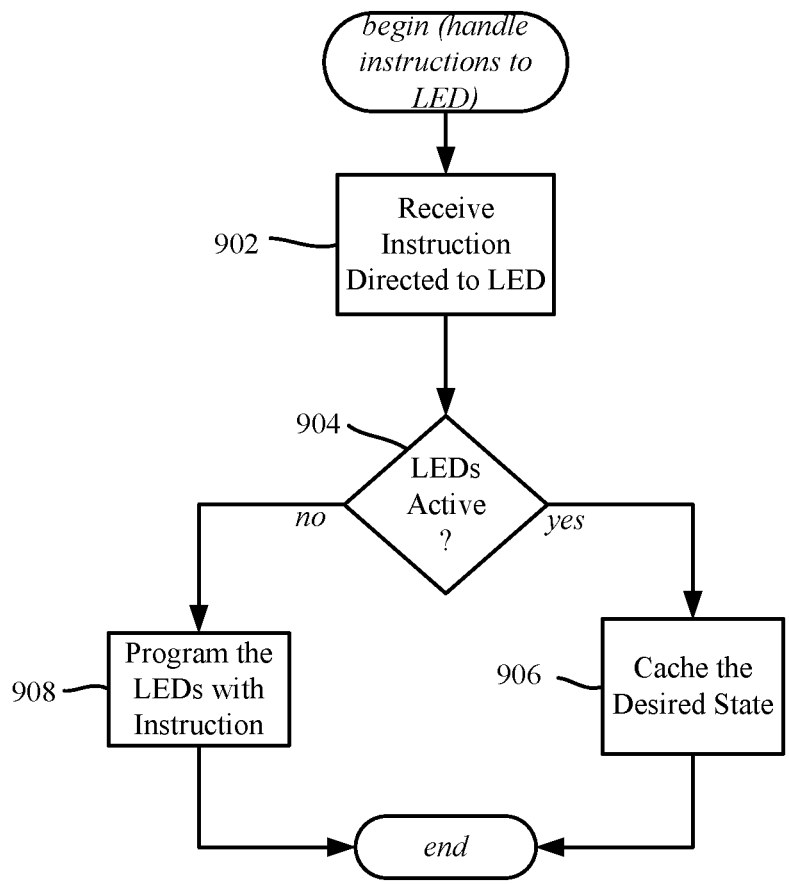
FIG. 9 is a flow diagram showing example operations related to handling LED instructions by a device agent or the like, in accordance with various aspects and implementations of the subject disclosure.

FIG. 9 is a flow diagram directed towards various example aspects described herein related to the agent or the like receiving an instruction at operation 902 directed towards an LED (e.g., via operation 812 or 816 of FIG. 8). Operation 904 evaluates whether the LEDs to be controlled are active. If so, operation 906 caches the desired state so that the LEDs remain active (e.g., until timed out). Otherwise, operation 908 programs the LEDs based on the received instruction.

Turning to example of power comparison to illustrate potential power savings, consider by way of a reasonable example that a single LED consumes 31 milliwatts when lit green, and 61 milliwatts when lit yellow. Note that this example is with a 3.3 volt supply; power will increase with 5.0 volt supply. Given that there can be LEDs for interfaces, power supplies, fans, controllers, other statuses, loss of continuity, and so forth, for one-hundred LEDs in an example switch, the per-switch average power consumption (assuming equally lit green and yellow) is:

$$100 \; LEDs * ((31+61)/2) = 4600 \text{ milliwatts or } 4.6 \text{ Watts.}$$

The per server/storage average power consumption, e.g., of fifty LEDs, is:

$$50 \; LEDs * ((31+61)/2) = 2300 \text{ mW or } 2.3 \text{ Watts.}$$

A rack (42U)–2+30 Devices (2*4.6)+(30*2.3)=78.2 Watts per rack from LED illumination. With twenty racks per pod there are 1,564 Watts per pod, with six pods per availability zone (AZ) totaling 9,384 Watts per AZ; for two Availability Zones per datacenter (DC) there can be power consumption of 18,768 Watts per datacenter.

FIG. 10 shows a user interface 1000 or the like that can be used to determine LED cost, and thereby estimate potential cost savings using the technology described herein. As can be seen with the above example of 18,768 Watts per datacenter, at 12 cents per kilowatt-hour, up to $19,728.90 can be saved per year; and further, regardless of such monetary savings, the reduction in energy usage is beneficial to the environment.

Figure 11:
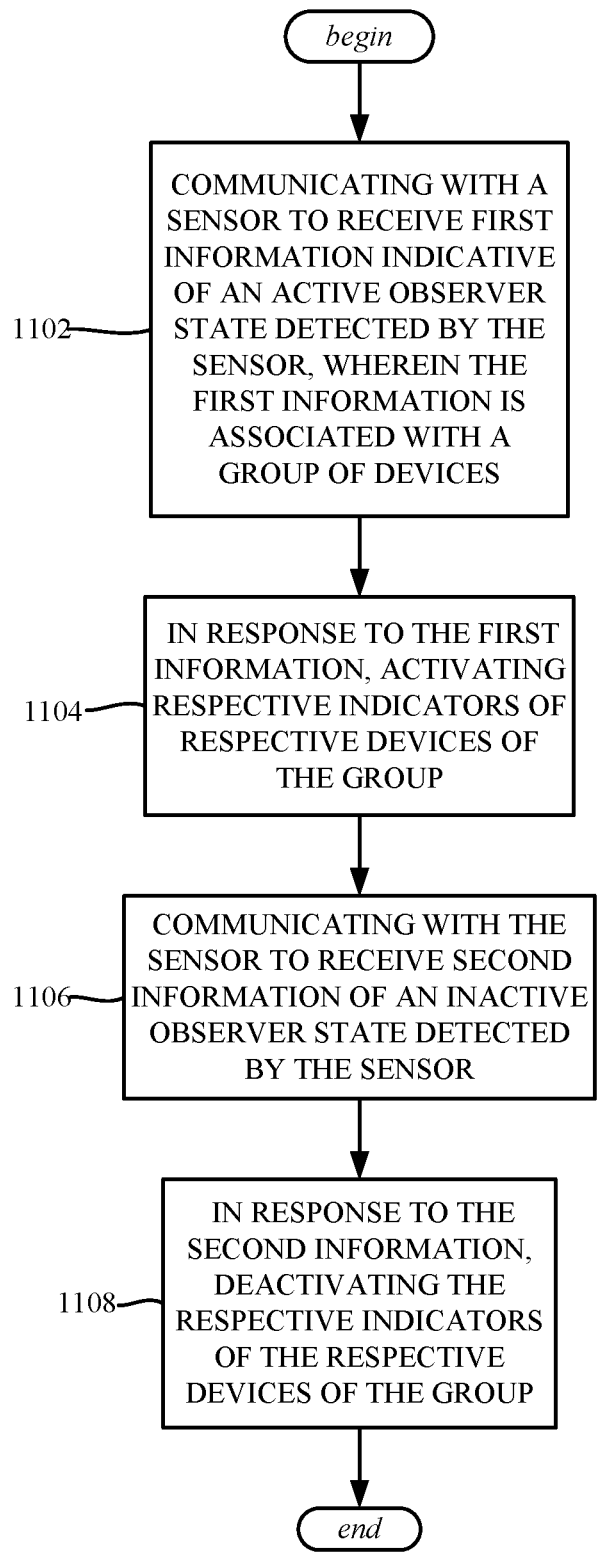
FIG. 11 is a flow diagram showing example operations related to activating and deactivating device indicators based on respective active and inactive observer state data, in accordance with various aspects and implementations of the subject disclosure.

One or more aspects can be embodied in a system, such as represented in the example operations of FIG. 11, and for example can include a memory that stores computer executable components and/or operations, and a processor that executes computer executable components and/or operations stored in the memory. Example operations can include operation 1102, which represents communicating with a sensor to receive first information indicative of an active observer state detected by the sensor, wherein the first information is associated with a group of devices. Operation 1104 represents, in response to the first information, activating respective indicators of respective devices of the group. Operation 1106 represents communicating with the sensor to receive second information of an inactive observer state detected by the sensor. Operation 1108 represents, in response to the second information, deactivating the respective indicators of the respective devices of the group.

At least one of the respective indicators can include a light emitting diode.

The group of associated devices can include at least one of: a server, a switch, a router, a storage device, a power supply, a fan, or a controller.

Communicating with the sensor to receive the first information can be triggered by a cabinet door sensor transitioning from a closed state to an opened state. Communicating with the sensor to receive the second information can be triggered by the cabinet door sensor transitioning from the opened state to the closed state.

Deactivating the respective indicators of the respective devices of the group can include starting a timer based on the second information, and transitioning the respective indicators to a reduced power mode of operation in response to the timer satisfying a duration criterion. The duration criterion can be user configurable.

Communicating with the sensor to receive the first information can be triggered by detection of motion.

Communicating with the sensor to receive the first information can be triggered by radio-frequency identification.

At least one of the respective devices can include an agent communicatively coupled for communications with the sensor. The agent can perform the activating of the respective indicators by generating at least one of: command line-generated output data generated via a command line or automatic graphical user interface-generated output data generated via a graphical user interface.

The system can include a centralized monitor, and further operations can include sending a message based on the first information to the centralized monitor.

Figure 12:
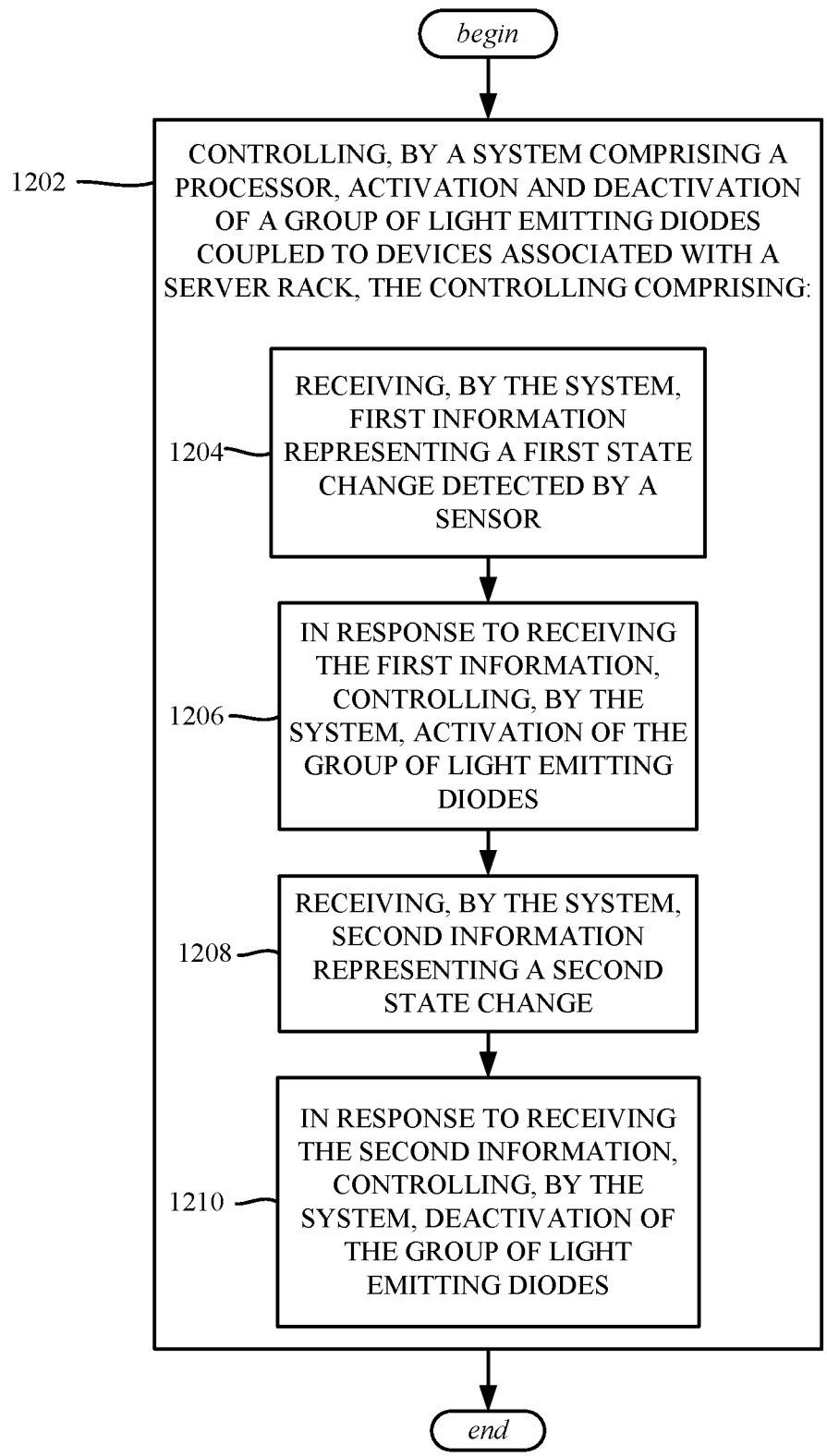
FIG. 12 is a flow diagram showing example operations related to controlling activation and deactivation of a group of LEDs coupled to devices associated with a server rack, in accordance with various aspects and implementations of the subject disclosure.

One or more example aspects, such as corresponding to example operations of a method, are represented in FIG. 12. Example operation 1202 represents controlling, by a system comprising a processor, activation and deactivation of a group of light emitting diodes coupled to devices associated with a server rack. The controlling can include receiving, by the system, first information representing a first state change detected by a sensor (example operation 1204), in response to receiving the first information, controlling, by the system, activation of the group of light emitting diodes (example operation 1206), receiving, by the system, second information representing a second state change (example operation 1208), and, in response to receiving the second information, controlling, by the system, deactivation of the group of light emitting diodes (example operation 1210).

Receiving the first information representing the first state change can include receiving a signal representing at least one of: door sensor state data, or motion sensor state data.

Controlling the deactivation of the group of light emitting diodes can include starting a timer based on the second information, and transitioning the group of light emitting diodes to a reduced power mode of operation responsive to the timer being determined to satisfy a duration criterion.

Controlling of the activation and the deactivation of the group of light emitting diodes can include outputting, by a program running on the system, activation command data and deactivation command data, respectively, to at least one of: a command line interface coupled to the group, or a graphical user interface coupled to the group.

Further operations can include sending, by the system, a first message based on the first information to a centralized monitor, and sending, by the system, a second message based on the second information to the centralized monitor.

Figure 13:
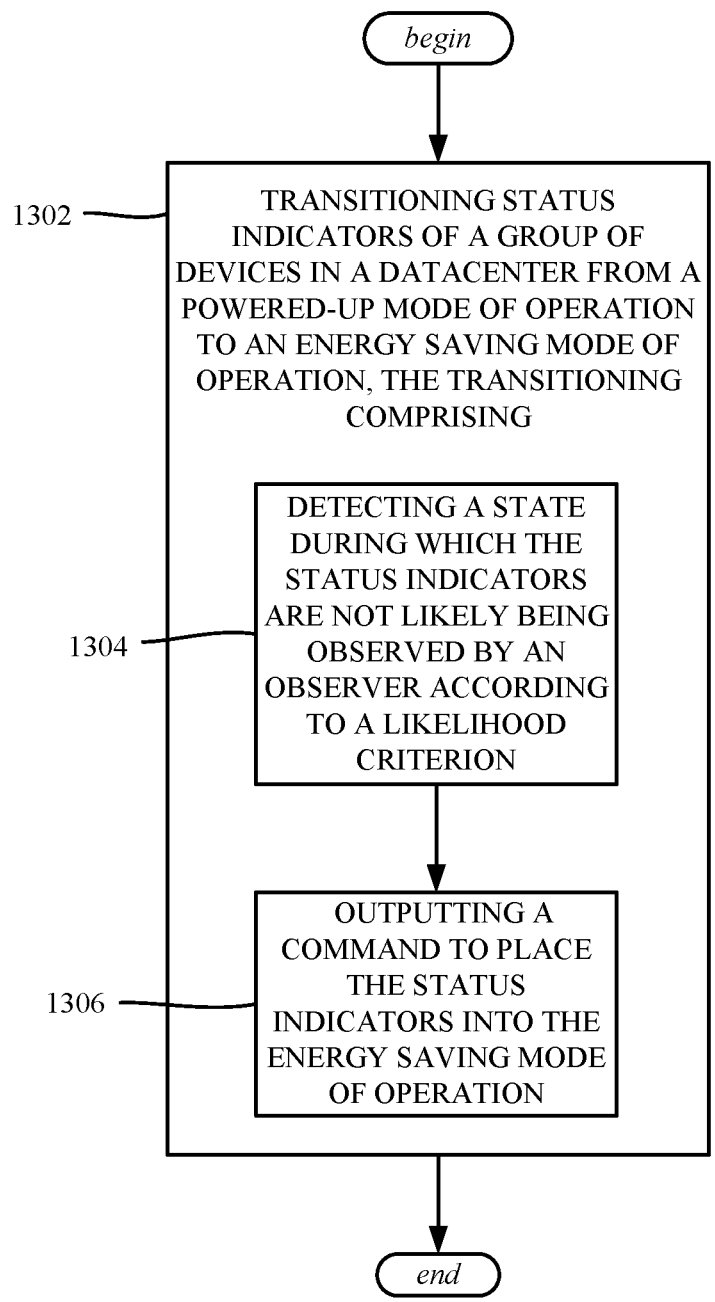
FIG. 13 is a flow diagram showing example operations related to transitioning status indicators of a group of devices in a datacenter from a powered-up mode of operation to an energy saving mode of operation, in accordance with various aspects and implementations of the subject disclosure.

FIG. 13 summarizes various example operations, e.g., corresponding to a machine-readable medium, comprising executable instructions that, when executed by a processor, facilitate performance of operations. Example operation 1302 represents transitioning status indicators of a group of devices in a datacenter from a powered-up mode of operation to an energy saving mode of operation, the transitioning can include detecting a state during which the status indicators are not likely being observed by an observer according to a likelihood criterion (example operation 1304), and outputting a command to place the status indicators into the energy saving mode of operation (example operation 1306).

Detecting the state during which the status indicators are not likely being observed can include determining observer inactivity proximate the group of devices.

The state can be a first state, the command can be a first command, and further operations can include comprise detecting a second state during which the status indicators are likely being observed by an observer, and outputting a second command to place the status indicators into the powered-up mode of operation.

As can be seen, the technology described herein facilitates power saving via intelligent control of LEDs.

Figure 14:
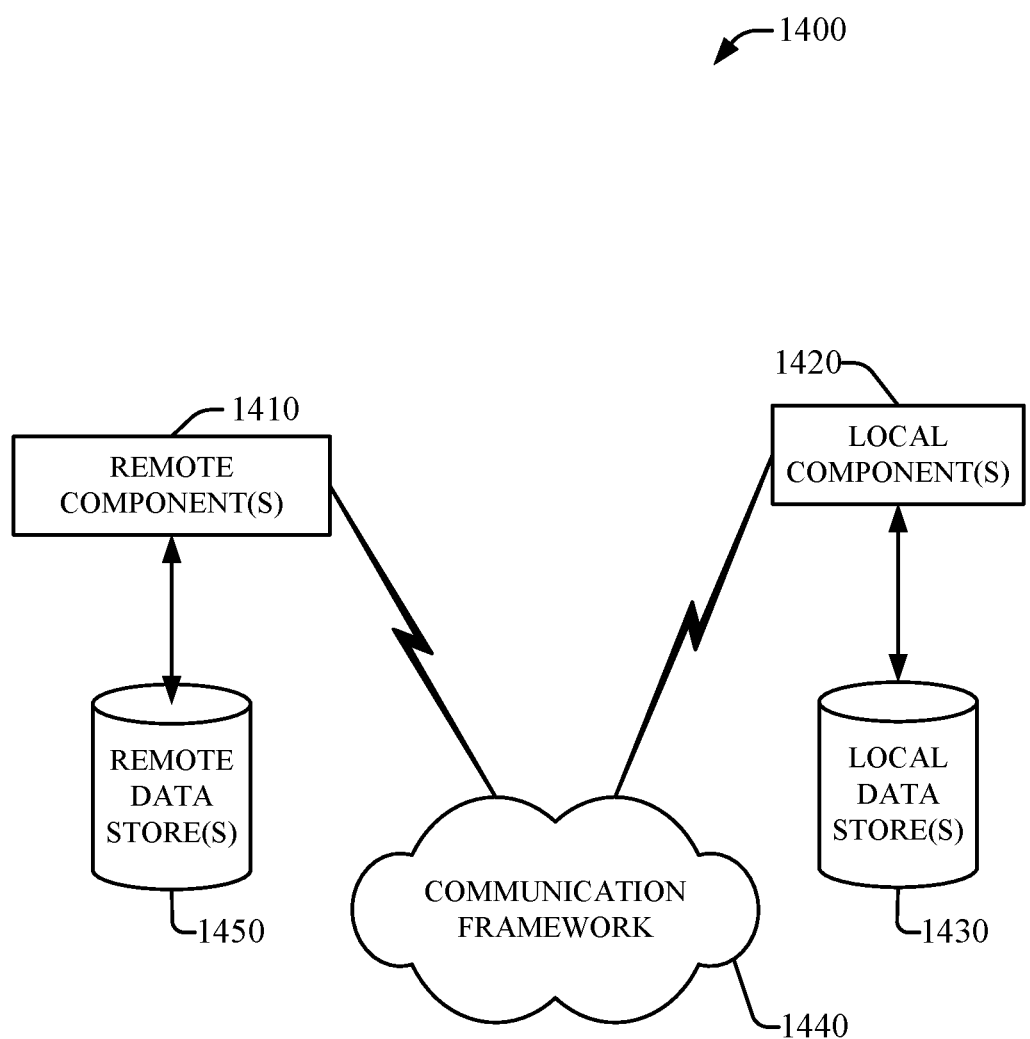
FIG. 14 is a block diagram representing an example computing environment into which aspects of the subject matter described herein may be incorporated.

FIG. 14 is a schematic block diagram of a computing environment 1400 with which the disclosed subject matter can interact. The system 1400 comprises one or more remote component(s) 1410. The remote component(s) 1410 can be hardware and/or software (e.g., threads, processes, computing devices). In some embodiments, remote component(s) 1410 can be a distributed computer system, connected to a local automatic scaling component and/or programs that use the resources of a distributed computer system, via communication framework 1440. Communication framework 1440 can comprise wired network devices, wireless network devices, mobile devices, wearable devices, radio access network devices, gateway devices, femtocell devices, servers, etc.

The system 1400 also comprises one or more local component(s) 1420. The local component(s) 1420 can be hardware and/or software (e.g., threads, processes, computing devices). In some embodiments, local component(s) 1420 can comprise an automatic scaling component and/or programs that communicate/use the remote resources 1410, etc., connected to a remotely located distributed computing system via communication framework 1440.

One possible communication between a remote component(s) 1410 and a local component(s) 1420 can be in the form of a data packet adapted to be transmitted between two or more computer processes. Another possible communication between a remote component(s) 1410 and a local component(s) 1420 can be in the form of circuit-switched data adapted to be transmitted between two or more computer processes in radio time slots. The system 1400 comprises a communication framework 1440 that can be employed to facilitate communications between the remote component(s) 1410 and the local component(s) 1420, and can comprise an air interface, e.g., Uu interface of a UMTS network, via a long-term evolution (LTE) network, etc. Remote component(s) 1410 can be operably connected to one or more remote data store(s) 1450, such as a hard drive, solid state drive, SIM card, device memory, etc., that can be employed to store information on the remote component(s) 1410 side of communication framework 1440. Similarly, local component(s) 1420 can be operably connected to one or more local data store(s) 1430, that can be employed to store information on the local component(s) 1420 side of communication framework 1440.

Figure 15:
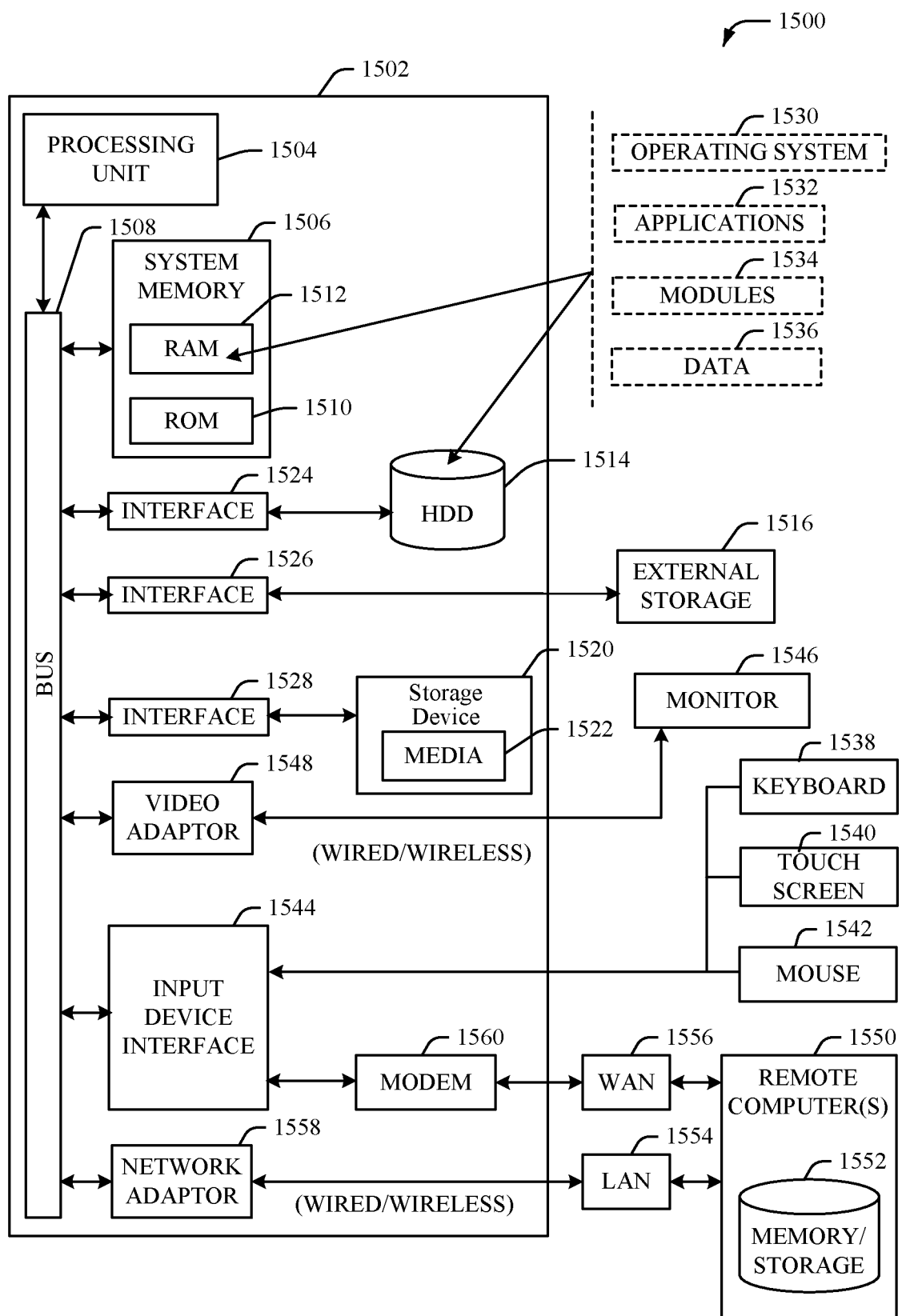
FIG. 15 depicts an example schematic block diagram of a computing environment with which the disclosed subject matter can interact/be implemented at least in part, in accordance with various aspects and implementations of the subject disclosure.

In order to provide additional context for various embodiments described herein, FIG. 15 and the following discussion are intended to provide a brief, general description of a suitable computing environment 1500 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IOT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 15, the example environment 1500 for implementing various embodiments of the aspects described herein includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes ROM 1510 and RAM 1512. A basic input/output system (BIOS) can be stored in a non-volatile memory such as ROM, erasable programmable read only memory (EPROM), EEPROM, which BIOS contains the basic routines that help to transfer information between elements within the computer 1502, such as during startup. The RAM 1512 can also include a high-speed RAM such as static RAM for caching data.

The computer 1502 further includes an internal hard disk drive (HDD) 1514 (e.g., EIDE, SATA), and can include one or more external storage devices 1516 (e.g., a magnetic floppy disk drive (FDD) 1516, a memory stick or flash drive reader, a memory card reader, etc.). While the internal HDD 1514 is illustrated as located within the computer 1502, the internal HDD 1514 can also be configured for external use in a suitable chassis (not shown). Additionally, while not shown in environment 1500, a solid state drive (SSD) could be used in addition to, or in place of, an HDD 1514.

Other internal or external storage can include at least one other storage device 1520 with storage media 1522 (e.g., a solid state storage device, a nonvolatile memory device, and/or an optical disk drive that can read or write from removable media such as a CD-ROM disc, a DVD, a BD, etc.). The external storage 1516 can be facilitated by a network virtual machine. The HDD 1514, external storage device(s) 1516 and storage device (e.g., drive) 1520 can be connected to the system bus 1508 by an HDD interface 1524, an external storage interface 1526 and a drive interface 1528, respectively.

The drives and their associated computer-readable storage media provide nonvolatile storage of data, data structures, computer-executable instructions, and so forth. For the computer 1502, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. The systems and methods described herein can be implemented utilizing various commercially available operating systems or combinations of operating systems.

Computer 1502 can optionally comprise emulation technologies. For example, a hypervisor (not shown) or other intermediary can emulate a hardware environment for operating system 1530, and the emulated hardware can optionally be different from the hardware illustrated in FIG. 15. In such an embodiment, operating system 1530 can comprise one virtual machine (VM) of multiple VMs hosted at computer 1502. Furthermore, operating system 1530 can provide runtime environments, such as the Java runtime environment or the .NET framework, for applications 1532. Runtime environments are consistent execution environments that allow applications 1532 to run on any operating system that includes the runtime environment. Similarly, operating system 1530 can support containers, and applications 1532 can be in the form of containers, which are lightweight, standalone, executable packages of software that include, e.g., code, runtime, system tools, system libraries and settings for an application.

Further, computer 1502 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1502, e.g., applied at the application execution level or at the operating system (OS) kernel level, thereby enabling security at any level of code execution.

A user can enter commands and information into the computer 1502 through one or more wired/wireless input devices, e.g., a keyboard 1538, a touch screen 1540, and a pointing device, such as a mouse 1542. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1504 through an input device interface 1544 that can be coupled to the system bus 1508, but can be connected by other interfaces, such as a parallel port, an IEEE 1594 serial port, a game port, a USB port, an IR interface, a BLUETOOTH® interface, etc.

A monitor 1546 or other type of display device can be also connected to the system bus 1508 via an interface, such as a video adapter 1548. In addition to the monitor 1546, a computer typically includes other peripheral output devices (not shown), such as speakers, printers, etc.

The computer 1502 can operate in a networked environment using logical connections via wired and/or wireless communications to one or more remote computers, such as a remote computer(s) 1550. The remote computer(s) 1550 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1552 is illustrated. The logical connections depicted include wired/wireless connectivity to a local area network (LAN) 1554 and/or larger networks, e.g., a wide area network (WAN) 1556. Such LAN and WAN networking environments are commonplace in offices and companies, and facilitate enterprise-wide computer networks, such as intranets, all of which can connect to a global communications network, e.g., the Internet.

When used in a LAN networking environment, the computer 1502 can be connected to the local network 1554 through a wired and/or wireless communication network interface or adapter 1558. The adapter 1558 can facilitate wired or wireless communication to the LAN 1554, which can also include a wireless access point (AP) disposed thereon for communicating with the adapter 1558 in a wireless mode.

When used in a WAN networking environment, the computer 1502 can include a modem 1560 or can be connected to a communications server on the WAN 1556 via other means for establishing communications over the WAN 1556, such as by way of the Internet. The modem 1560, which can be internal or external and a wired or wireless device, can be connected to the system bus 1508 via the input device interface 1544. In a networked environment, program modules depicted relative to the computer 1502 or portions thereof, can be stored in the remote memory/storage device 1552. It will be appreciated that the network connections shown are examples and other means of establishing a communications link between the computers can be used.

When used in either a LAN or WAN networking environment, the computer 1502 can access cloud storage systems or other network-based storage systems in addition to, or in place of, external storage devices 1516 as described above. Generally, a connection between the computer 1502 and a cloud storage system can be established over a LAN 1554 or WAN 1556 e.g., by the adapter 1558 or modem 1560, respectively. Upon connecting the computer 1502 to an associated cloud storage system, the external storage interface 1526 can, with the aid of the adapter 1558 and/or modem 1560, manage storage provided by the cloud storage system as it would other types of external storage. For instance, the external storage interface 1526 can be configured to provide access to cloud storage sources as if those sources were physically connected to the computer 1502.

The computer 1502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:
   at least one memory that stores computer executable instructions; and
   at least one processor that executes the computer executable instructions to perform operations comprising:
      receiving, from a first sensor in a defined area of a device cabinet, an indication that a user is in the defined area of the device cabinet, wherein the device cabinet comprises groups of devices, and wherein the groups of devices comprise respective external indicators that are deactivated;
      in response to receiving the indication, activating a second sensor in the defined area of the device cabinet, wherein the second sensor comprises an eye gaze tracking sensor;
      receiving, from the eye gaze tracking sensor, first information indicative of an eye gaze of the user being directed in a direction corresponding to at least one device of a group of the groups of devices;
      in response to receiving the first information, activating respective first external indicators of the group of devices of the respective external indicators of the groups of devices, while leaving deactivated respective second external indicators of other groups of the groups of devices other than the group of devices;
      receiving, from the eye gaze tracking sensor, second information indicative of the eye gaze of the user not being directed in any direction corresponding to any device of the group of devices; and
      in response to receiving the second information, deactivating the respective first external indicators of the group of devices.

2. The system of claim 1, wherein the respective external indicators comprise a light emitting diode.

3. The system of claim 1, wherein the groups of devices comprise at least one of: a server, a switch, a router, a storage device, a power supply, a fan, or a controller.

4. The system of claim 1, wherein the first sensor comprises a cabinet door sensor.

5. The system of claim 1, wherein the first sensor comprises a motion sensor.

6. The system of claim 1, wherein the deactivating of the respective first external indicators of the group of devices comprises starting a timer based on the second information, and transitioning the respective first external indicators of the group of devices to a reduced power mode of operation in response to the timer satisfying a duration criterion.

7. The system of claim 1, wherein the group of devices is a first group of devices, wherein the direction is a first direction, and wherein the operations further comprise:
   receiving, from the eye gaze tracking sensor, third information indicative of the eye gaze of the user being directed in a second direction associated with at least one device of a second group of the groups of devices; and
   in response to receiving the second information, activating respective third external indicators of the second group of devices.

8. The system of claim 1, wherein the first sensor comprises a radio-frequency identification sensor.

9. The system of claim 1, wherein the at least one device of the group of devices is at least one first device, and wherein at least one second device of the group of devices comprises an agent.

10. The system of claim 9, wherein the agent performs the activating of the respective first external indicators of the at least one first device.

11. A method, comprising:
   receiving, by a system comprising at least one processor, from a first sensor in a defined area of a device cabinet, an indication that a user is in the defined area of the device cabinet, wherein the device cabinet comprises groups of devices, and wherein the groups of devices comprise respective external indicators that are deactivated;
   in response to receiving the indication, activating, by the system, a second sensor in the defined area of the device cabinet, wherein the second sensor comprises an eye gaze tracking sensor;
   receiving, by the system, from the eye gaze tracking sensor, first information indicative of an eye gaze of the user being directed in a direction associated with at least one device of a group of the groups of devices;
   in response to receiving the first information, activating, by the system, respective first external indicators of the group of devices, while leaving deactivated respective second external indicators of other groups of the groups of devices other than the group of devices;
   receiving, by the system, from the eye gaze tracking sensor, second information indicative of the eye gaze not being directed in any direction associated with any device of the group of devices; and
   in response to receiving the second information, deactivating, by the system, the respective first external indicators of the group of devices.

12. The method of claim 11, wherein the respective external indicators comprise a light emitting diode.

13. The method of claim 11, wherein the deactivating of the respective first external indicators of the group of devices comprises starting a timer based on the second information, and transitioning the respective first external indicators of the group of devices to a reduced power mode of operation responsive to the timer being determined to satisfy a duration criterion.

14. The method of claim 11, wherein the group of devices is a first group of devices, wherein the direction is a first direction, wherein the at least one device is at least one first device, and further comprising:
   receiving, by the system, from the eye gaze tracking sensor, third information indicative of the eye gaze of the user being directed in a second direction associated with at least one second device of a second group of the groups of devices other than the first group; and
   in response to receiving the second information, activating, by the system, respective third external indicators of the second group of devices.

15. The method of claim 11, wherein the first sensor comprises a radio-frequency identification sensor.

16. A non-transitory machine-readable medium, comprising executable instructions that, when executed by at least one processor, facilitate performance of operations, the operations comprising:
   receiving, from a first sensor in a defined area of a server rack, an indication that a person is in the defined area of the server rack, wherein the server rack comprises groups of devices, and wherein the groups of devices comprise respective external indicators that are deactivated;
   in response to receiving the indication, activating a second sensor in the defined area of the server rack, wherein the second sensor comprises an eye gaze tracking sensor;
   receiving, from the eye gaze tracking sensor, first information indicative of an eye gaze of the person being directed in a direction of at least one device of a group of the groups of devices; and
   in response to receiving the first information, activating respective first external indicators of the group of devices.

17. The non-transitory machine-readable medium of claim 16, wherein the operations further comprise:
   receiving, from the eye gaze tracking sensor, second information indicative of the eye gaze of the person not being directed in any direction corresponding to any device of the group of devices; and
   in response to receiving the second information, deactivating respective first external indicators of the group of devices of the respective external indicators of the groups of devices.

18. The non-transitory machine-readable medium of claim 17, wherein the group of devices is a first group of devices, wherein the direction is a first direction, wherein the at least one device is at least one first device, and wherein the operations further comprise:
   receiving, from the eye gaze tracking sensor, third information indicative of the eye gaze of the person being directed in a second direction associated with at least one second device of a second group of the groups of devices; and
   in response to receiving the second information, activating respective second external indicators of the second group of devices.

19. The non-transitory machine-readable medium of claim 16, wherein the respective external indicators comprise a light emitting diode.

20. The non-transitory machine-readable medium of claim 16, wherein the first sensor comprises a radio-frequency identification sensor.

* * * * *